A. D. MORRIS.
ROD PACKING.
APPLICATION FILED SEPT. 14, 1909.

955,662.

Patented Apr. 19, 1910.

Witnesses
Harry L. Smith
Hamilton D. Turner

Inventor
Alfred D. Morris
by his Attorneys
Smith & Frazier

UNITED STATES PATENT OFFICE.

ALFRED D. MORRIS, OF PHILADELPHIA, PENNSYLVANIA, ASSIGNOR TO MORRIS METALLIC PACKING COMPANY, OF PHILADELPHIA, PENNSYLVANIA, A CORPORATION OF PENNSYLVANIA.

ROD-PACKING.

955,662.

Specification of Letters Patent.

Patented Apr. 19, 1910.

Application filed September 14, 1909. Serial No. 517,609.

*To all whom it may concern:*

Be it known that I, ALFRED D. MORRIS, a citizen of the United States, residing in Philadelphia, Pennsylvania, have invented certain Improvements in Rod-Packings, of which the following is a specification.

The object of my invention is to so construct a packing for the piston rods of gas or other engines as to prevent the rapid deterioration of the packing due to contact of the highly heated gases and other products of combustion from the cylinder of the engine, with the springs or other parts of the packing liable to be injured by the heat of such gases.

This object I attain in the manner hereinafter set forth, reference being had to the accompanying drawing, in which—

Figure 1:
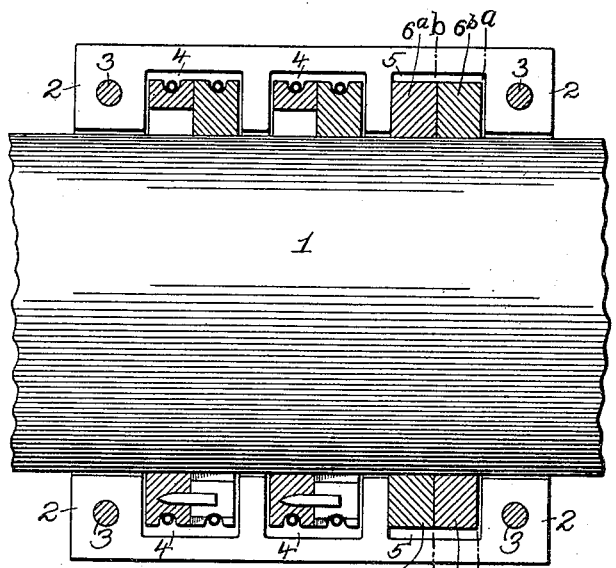
Figure 2:
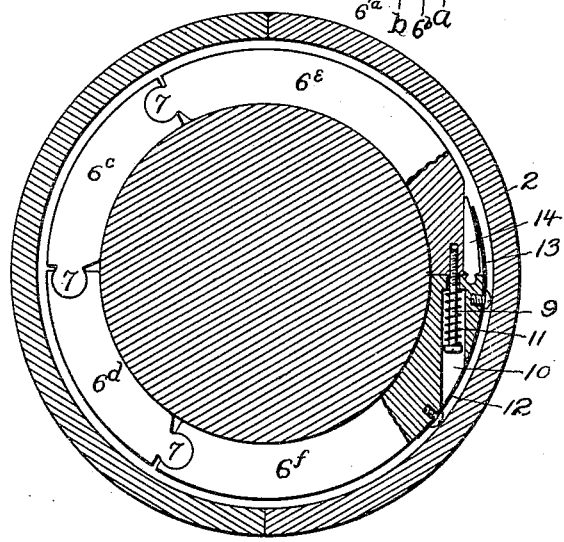
Figure 3:
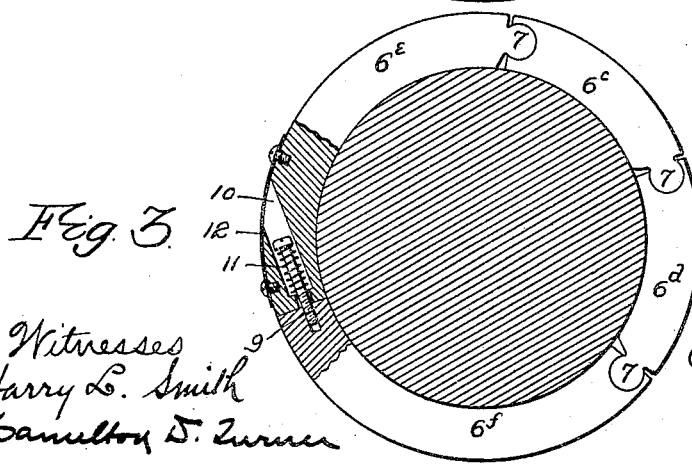

Figure 1 is a longitudinal vertical section of a packing constructed in accordance with my invention, part of the piston rod being shown in elevation; Fig. 2 is a transverse section on the line $a$—$a$, Fig. 1, with parts of the packing ring also shown in section, and Fig. 3 is a transverse section on the line $b$—$b$, Fig. 1, omitting the casing for the packing rings.

In the operation of gas engines having their piston rods provided with sectional metallic packings of the usual character, said packings are rapidly deteriorated by reason of the access thereto of the highly heated gases from the cylinder of the engine, the heat quickly destroying the temper of the springs which are, in ordinary sectional metallic packings, relied upon to maintain the contact of the ring sections with the rod, thereby rendering the packing useless for the performance of its intended function.

I find that this objection can be largely, if not wholly, overcome by the employment of a buffer ring or rings between the cylinder and the main packing rings, such buffer ring or rings serving to check the flow of the gas and prevent, either wholly or in large measure, the access of said gas to the main packing rings.

In the accompanying drawing, 1 represents part of the piston rod of a gas engine and 2 a two-part casing intended to be secured in any appropriate way to the cylinder head or other available portion of the engine structure, the two parts of the casing being secured together by bolts 3 so that said casing can be readily applied to or removed from the rod.

Within the casing are chambers 4 for the reception of any ordinary form of sectional metallic ring packing, and located between the cylinder head and the first of the packing chambers are one or more buffer rings, which may be conveniently disposed in another chamber 5 of the casing 2.

In the packing shown in the drawing the chamber 5 contains two buffer rings $6^a$ and $6^b$, each of which is composed of two or more segments, which, when the ring is first fitted to the rod are in contact with one another so that the ring is practically solid, and acts as an efficient buffer for preventing the forward flow of gases around the rod. In order, however, that the ring may be contracted to compensate for the enlargement of its opening caused by wear of the ring segments from contact with the rod, said ring contains resilient means for contracting its segments when the contacting faces of the same have been filed away to such an extent as may be required by the amount of wear upon the segments.

As shown in the drawing, each of the buffer rings is composed of four segments $6^c$, $6^d$, $6^e$ and $6^f$, connected together by hinge joints each composed of a segmental boss 7 upon one segment, fitting snugly within a corresponding segmental recess in the adjoining segment with sufficient play between the adjoining ends of the two segments to permit of the desired contraction of the ring upon the rod, the hinge joints of the segments being so disposed that when the rings are placed face to face in the chamber 5, a solid portion of a segment of one ring will register with each hinge joint of the other ring, a dowel pin $x$ or other means being used to cause the rings to preserve such relation. The segment $6^e$ of each ring has secured to it a bolt 9 which projects into a chamber 10 in the adjoining end of the segment $6^f$ of the ring, a coiled spring 11 surrounding this bolt and being confined between the head of the latter and the base of the chamber 10, so that it serves to constantly draw the ends of the segments $6^e$ and $6^f$ toward each other and thus close frictional contact of the inner face of the ring with the rod 1. When the ring is first applied to the rod, the ends of the segments 6ᵉ and 6ᶠ are in contact with one another, so that the ring is practically solid. As the inner face of the ring is worn away by contact with the rod, such wear is compensated for by filing away the end face of one or both of the segments to the desired extent, whereby when the ring is again applied to the rod and fits snugly thereto said end faces of the segments will be again in contact.

The outer end of the chamber 10 is closed by a plate 12 suitably secured to the peripheral portion of the segment 6ᶠ, the end of this plate projecting beyond the end of the segment 6ᵉ so as to constitute a spring finger 13 which presses upon the outer face of a flap 14 pivotally connected to the end of the segment 6ᶠ and bearing against a flattened portion of the outer face of the segment 6ᵉ, as shown in Fig. 2, said flap serving to close any gap which may have been left between the adjoining ends of the segments because of the filing away of too much of the same, and thereby preventing the radial flow of gas between the segments and into the chamber 5.

The buffer rings receive the force of the volume of gases flowing forwardly from the engine cylinder around the rod and serve to check said flow and prevent access of any material portion of the gases to the ring-containing chambers 4 in advance of the chamber 5, thereby preventing the deterioration of the packings in the forward chambers which would otherwise be caused by the access of the hot gases thereto.

While I prefer to use the pivoted flap 14 in connection with the segments 6ᵉ and 6ᶠ of both rings, this is not essential and in Fig. 3 I have illustrated the ring 6ᵇ as one in which it is not employed. In both forms of ring, however, the bolt 9 and its surrounding spring 11 are contained in a chamber which is practically closed against the access of the heated gases, hence the life of said spring will be prolonged and the buffer ring will remain in operative condition for a long period.

The packing may, if desired, consist entirely of buffer rings and each of the latter may have but two segments connected by a single hinge joint, the use of a greater number of segments and a plurality of hinge joints being preferred, however, because of the greater flexibility of the ring which is thus secured, and the closer fitting of the ring to the rod thereby permitted after the ring begins to wear.

I claim:—

1. A rod packing having a buffer ring composed of segments normally in end contact, and provided with tangentially acting resilient means for maintaining them in such condition.

2. A rod packing having a buffer ring composed of segments normally in end contact, and provided with resilient means for maintaining them in such condition, such resilient means being contained in a closed chamber in one of the segments.

3. A rod packing having a buffer ring composed of segments hinged together and having meeting ends normally in contact and provided with tangentially acting resilient means for maintaining them in such condition.

4. A rod packing having a buffer ring composed of segments hinged together and having meeting ends normally in contact and provided with resilient means for maintaining them in such condition, such resilient means being contained in a closed chamber in one of the segments.

5. A rod packing having a buffer ring composed of segments connected together by a hinge joint composed of a segmental lug on one segment fitted to a like recess in the adjoining segment and permitting play of each segment in either direction.

6. A rod packing having a buffer ring composed of segments connected together by a plurality of hinge joints and having abutting ends, and tangentially acting resilient means for drawing said ends together.

7. A rod packing having a buffer ring composed of segments provided with means for yieldingly drawing together adjoining ends of the segments and a pivotally mounted flap for closing the gap between said ends.

8. A rod packing having a ring composed of segments whose adjoining ends are yieldingly drawn together by means of a spring contained in a closed chamber in one of said members.

9. A rod packing ring composed of segments one having a projecting bolt and the other a chamber to receive said bolt, and a spring surrounding the latter and serving to act through the medium of the bolt to draw the two segments toward each other.

10. A rod packing ring composed of two segments yieldingly drawn together by means of a spring contained in a chamber in one of said segments, a flap for closing the gap between the two segments, and a plate which performs the double function of closing said chamber and acting as a spring to depress such flap.

In testimony whereof, I have signed my name to this specification, in the presence of two subscribing witnesses.

ALFRED D. MORRIS.

Witnesses:
 HAMILTON D. TURNER,
 KATE A. BEADLE.